US008499781B2

(12) United States Patent
Jing et al.

(10) Patent No.: US 8,499,781 B2
(45) Date of Patent: Aug. 6, 2013

(54) FLUSH CONTROL VALVE CORE ASSEMBLY

(75) Inventors: Sean Jing, Shanghai (CN); James Huang, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 310 days.

(21) Appl. No.: 12/823,555

(22) Filed: Jun. 25, 2010

(65) Prior Publication Data

US 2010/0319792 A1 Dec. 23, 2010

Related U.S. Application Data

(63) Continuation-in-part of application No. PCT/CN2008/002089, filed on Dec. 26, 2008.

(30) Foreign Application Priority Data

Dec. 27, 2007 (CN) ...................... 2007 2 0077467 U

(51) Int. Cl.
*F16K 51/00* (2006.01)
(52) U.S. Cl.
USPC .......................................... 137/245; 251/337
(58) Field of Classification Search
USPC .................. 251/35, 337, 33, 119, 118, 30.02, 251/30.01, 120; 137/535, 245, 244, 242
See application file for complete search history.

(56) References Cited

U.S. PATENT DOCUMENTS

| 985,196 | A | * | 2/1911 | Morgan et al. | 137/176 |
| 2,721,053 | A | * | 10/1955 | Fry | 251/263 |
| 5,360,197 | A | | 11/1994 | Reiter et al. | |
| 5,456,279 | A | * | 10/1995 | Parsons et al. | 137/245 |
| 5,738,138 | A | * | 4/1998 | Grunert et al. | 137/245 |
| 6,167,905 | B1 | | 1/2001 | Malloy et al. | |
| 7,028,975 | B2 | * | 4/2006 | Lee et al. | 251/26 |

FOREIGN PATENT DOCUMENTS

| CN | 201169816 Y | 12/2008 |
| DE | 19841678 A1 | 3/1999 |
| EP | 0333652 A1 | 9/1989 |
| GB | 2 135 024 A | 8/1984 |
| JP | 2001173821 A | 6/2001 |

OTHER PUBLICATIONS

International Search Report: PCT/CN2008/002089.

* cited by examiner

*Primary Examiner* — Craig Schneider
*Assistant Examiner* — Andrew J Rost
(74) *Attorney, Agent, or Firm* — Foley & Lardner LLP

(57) ABSTRACT

A flush control valve core assembly is provided including a valve core body, a back spring accommodated in the valve core body, a valve piece and a valve shaft. The valve piece includes a discharge hole. A portion of the back spring extends as a pin structure, which is able to slidably move in the discharge hole. The pin structure is formed by a free end of the back spring horizontally bending towards the center, and then bending downwards vertically. The back spring of the flush control valve core assembly has a smaller size, which is more reliable and more easily mounted.

20 Claims, 4 Drawing Sheets

FLUSH CONTROL VALVE CORE ASSEMBLY

FIELD OF THE INVENTION

The present invention relates to a flush control valve core assembly, and in particular a flush control valve core assembly of a flush device in a toilet.

BACKGROUND OF THE INVENTION

In the prior art, a general back (back moving) spring of a control valve of a flush device in a toilet is a common cylindrical compression spring having a circular-section, and which is mounted between a valve cover and a valve piece for the position-restoring act only. Meanwhile, the discharge hole of the valve piece in the control valve is very small. The discharge hole is difficult to make and is also often jammed by impurities, so it needs an additional cleaning device that is also difficult to position into the discharge hole.

As shown as FIG. 1, a back spring 92 is set in a valve core 9 to overcome the above-mentioned defects in the prior arts. It is mounted between a valve cover 91 and a valve piece 93. A valve core body 94 is around the outside of the valve cover 91 and the valve piece 93. The back spring 92 has a cylindrical frame. At one end of this cylindrical compression spring, the steel wire bends outward for a distance in the direction parallel to the diameter of the spring, and then bends by 90 degrees along the direction towards the other end of the back spring 92 to form a pin 95 parallel to the axial line of the back spring 92. During operation, the pin goes through a discharge hole 96 of the valve piece 93. The pin 95 is so mounted that it may be positioned in the discharge hole. When the valve piece 93 is moving, the pin 95 can clean out any impurities in time to avoid a jam. Meanwhile, the discharge hole 96 may be larger due to the existence of the pin 95, which may allow the discharge hole 96 to be processed easily. But the back spring of this flush control valve still has the defects that it is not easily positioned into the discharge hole and its size is still too big.

In the prior art, in the process of accommodating and using the pin and back spring of the valve core, it is difficult to correctly keep the pin positioned into the discharge hole of the valve core. Thus, the pin may easily be bent out of shape during use and lose its function. Moreover, the pin is easily lost in the process of maintenance to the flush control valve core.

Therefore, it is necessary to provide a flush control valve having a back spring which has a reliable structure and can be held steadily within the valve core body.

SUMMARY OF THE INVENTION

An aspect or embodiment of this invention pertains to a flush control valve core assembly with an improved spring structure. The invention includes a flush control valve core assembly including a valve core body, a back spring accommodated in the valve core body, a valve piece and a valve shaft. The valve piece has a discharge hole. A portion of the back spring extends as a pin structure, which is able to slidably move in the discharge hole. The pin structure may be formed by a free end of the spring horizontally bending towards the center and then bending downwards vertically, for example.

Compared with the prior art, the back spring in the flush control valve core assembly of the invention has a smaller size, which is more reliable and is more easily mounted.

In another aspect or embodiment of the invention, the back spring of the flush control valve core assembly also has a holder matched with the valve shaft and fastened in the valve core body by a fastener, such as a nut for example.

Compared with the prior art, the back spring of the invention can effectively keep the pin and the discharge hole of the valve core in the right position and keep the discharge hole of the flush control valve core assembly unblocked. Also, the accommodating and maintenance process to the flush control valve core assembly is easier.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner. Further, in reference to the drawings, the same structure parts or functions are marked with the same numbers on the drawings.

Figure 1:
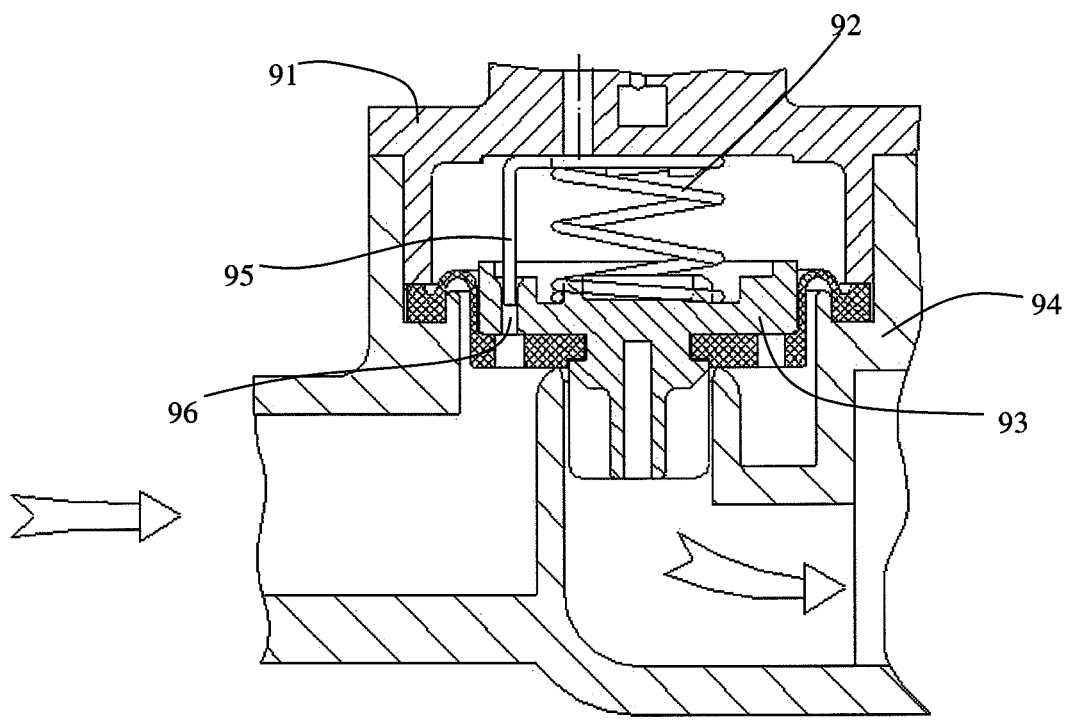
FIG. 1 is a side cross-sectional view of a typical flush control valve in the prior art.
Figure 2:
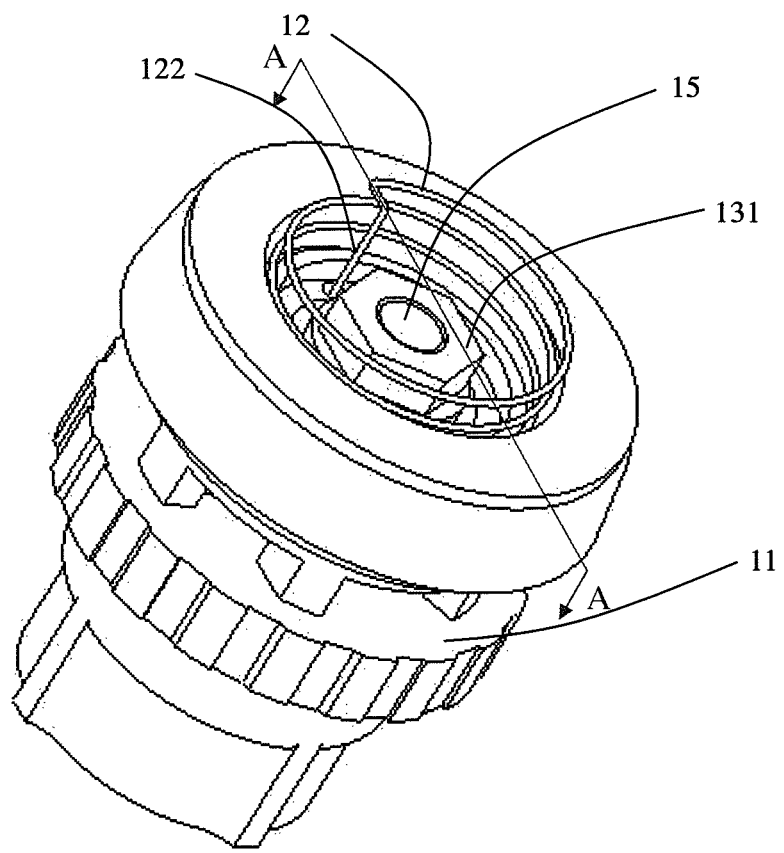
FIG. 2 is a perspective view of an embodiment of a flush control valve core assembly.
Figure 3:
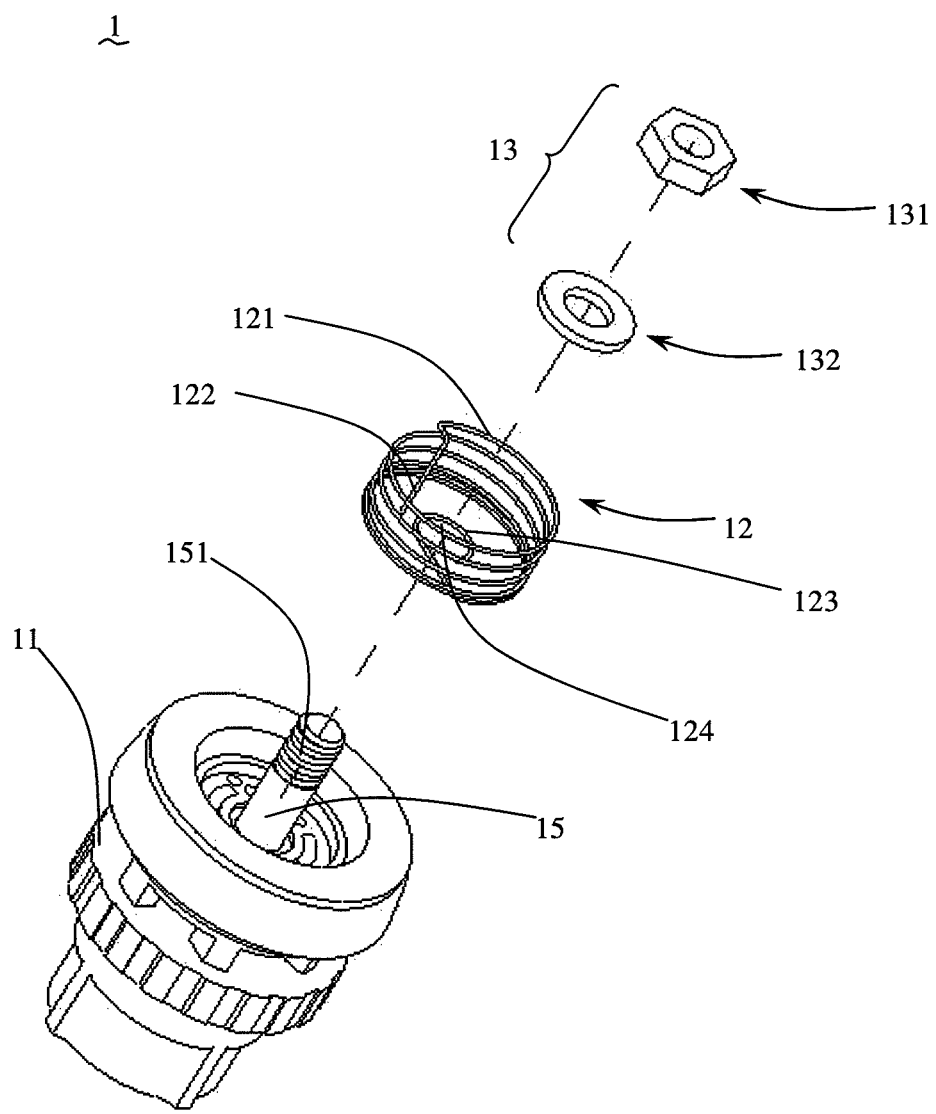
FIG. 3 is an exploded perspective view of the flush control valve core assembly of FIG. 2.
Figure 4:
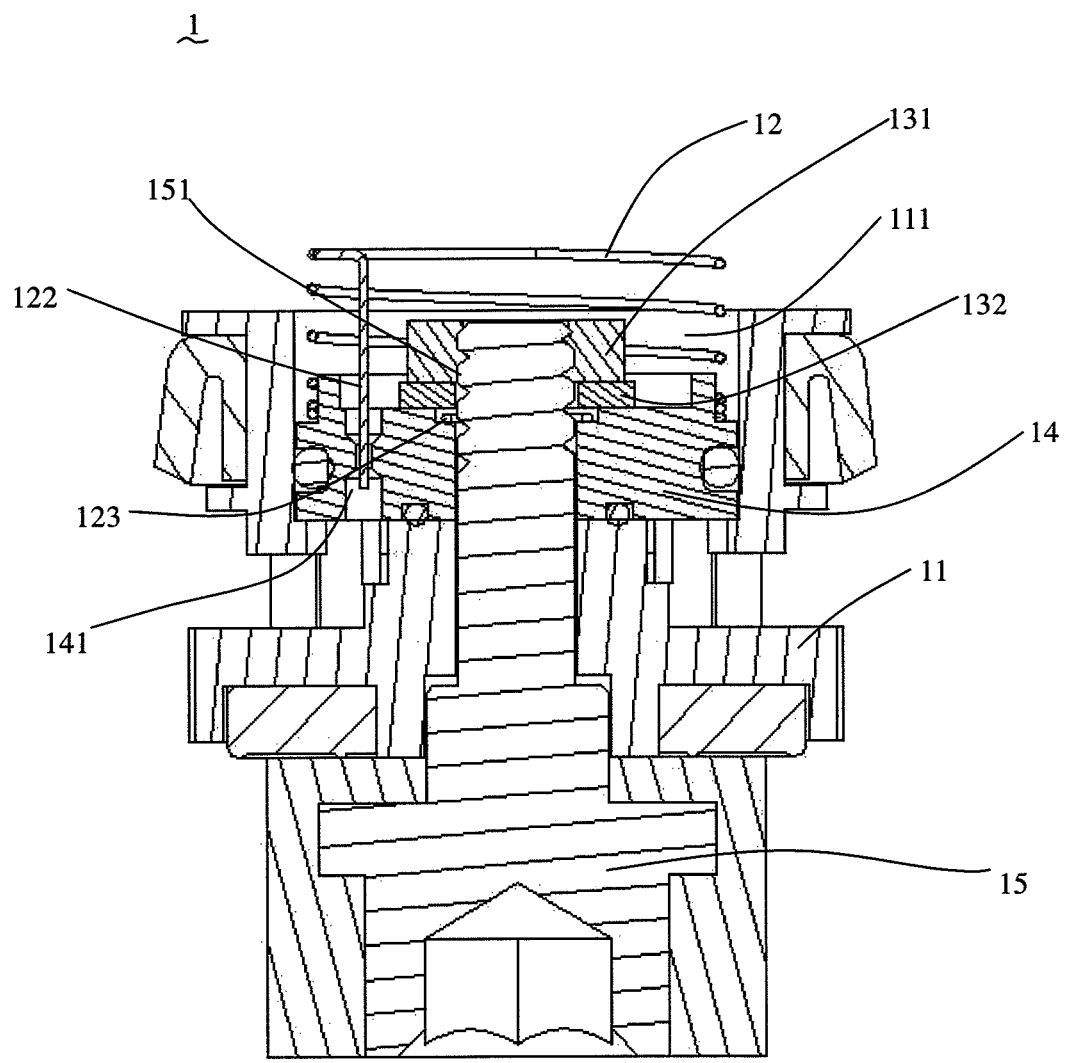
FIG. 4 is a side cross-sectional view along the A-A line of the flush control valve core assembly of FIG. 2.

As shown in FIG. 2 to FIG. 4, an embodiment of a flush control valve core assembly 1 includes a valve core body 11, a back spring 12, a fastener 13 for fastening the back spring 12 to the valve core body 11, a valve piece 14, and a valve shaft 15. The valve core body 11 has a receiving space 111. In this embodiment, the fastener 13 includes a nut 131 and a gasket 132. Thread 151 on a portion of the valve shaft 15 is matched with the nut 131.

Referring to FIG. 3, the illustrated embodiment of the back spring 12 includes a cylindrical frame 121. A first free end of the cylindrical frame 121 extends as a pin 122 wherein a first portion may be horizontally bent by 90 degrees towards the center of the cylindrical frame 121 and then a second portion may be bent vertically downwards by 90 degrees, for example. A holder 123 may be formed horizontally by the second free end of the cylindrical frame 121, for example. The holder 123 may be formed by a third portion bending towards the center of the cylindrical frame 121, and having a fastening circle 124 that is matched with the valve shaft 15.

As shown in FIG. 2 and FIG. 4, the valve piece 14 is mounted inside the receiving space 111 of the valve core body 11. The valve shaft 15 goes through the valve core body 11 and the front end of the valve shaft 15 goes through the valve piece 14 and protrudes within the receiving space 111. The back spring 12 is mounted on the valve piece 14, and the cylindrical frame 121 of the back spring 12 is positioned relative to the periphery of the valve piece 14. The pin 122 is positioned in a discharge hole 141. The fastening circle 124 of the holder 123 in the back spring 12 is positioned around the valve shaft 15.

The fastener 13 and the valve core body 11 are mounted together. The gasket 132 is set over the valve shaft 15 and the bottom of the gasket 132 presses the holder 123 of the spring 12. The nut 131 matches with the thread 151 of the valve shaft 15. When the nut 131 is fastened, the back spring 12, valve piece 14 and the valve shaft 15 are held together steadily with the valve core body 11.

During use, the illustrated embodiment of the flush control valve core assembly 1 moves up and down inside a flush control valve (not shown) for the control of a solenoid valve and water pressure for example. The spring 12 engages a valve cover (not shown) during movement for example, which leads to the pin 122 of the back spring 12 slidably moving in the discharge hole 141 of the valve piece 14 because of the elastic force.

Mounted like this, during use of the flush control valve assembly, the discharge hole 141 will not be jammed by the feculence or the impurities in the water. Meanwhile, the pin 122 of the back spring 12 of the flush control valve core assembly 1 in this illustrated embodiment is mounted inside the cylindrical frame 121 of the back spring 12. Therefore, the size of the back spring 12 can be reduced. The back spring 12 is also more reliable and more easily accommodated than the back spring in the prior art in which the pin is mounted outside the back spring. Moreover, the back spring 12 of the flush control valve core assembly 1 of this illustrated embodiment has a holder 123 that can be held steadily with the valve core body 11 of the flush control valve core assembly 1. This can avoid defects in the prior art such as the positional relationship of the pin and the discharge hole of the flush control valve core not being kept; the pin being easily bent out of shape during use, thereby losing its function; and the pin being lost easily in the maintenance process of the flush control valve.

The holder 123 of the back spring 12 of the flush control valve core assembly 1 in this illustrated embodiment and the valve core body 11 are fastened not only by the nut 131, but also by an interference fit between the fastener 13 having different structures and the valve shaft 15. In another embodiment of this invention, the holder 123 of the back spring 12 of the flush control valve core assembly 1 can be fastened to the valve core body 11 by buckling or holding, for example.

It is understood that the preceding description is given merely by way of illustration and not in limitation of the invention and that various modifications based on the above-mentioned embodiments may be made thereto without departing from the scope of the invention as claimed.

The invention claimed is:

1. A flush control valve core assembly comprising:
   a valve core body;
   a back spring accommodated in the valve core body;
   a valve piece; and
   a valve shaft fixedly connected to the valve core body;
   wherein the valve piece comprises a discharge hole and a portion of the back spring extends as a pin structure;
   wherein the pin structure is adapted to slidably move in the discharge hole; and
   wherein the pin structure is formed by a first portion of the back spring horizontally bending towards the center of the back spring and a second portion of the back spring bending downwards vertically.

2. The flush control valve core assembly of claim 1, wherein the back spring further comprises a holder formed by a bent third portion of the back spring.

3. The flush control valve core assembly of claim 2, wherein the flush control valve core further comprises a fastener to fasten the holder of the back spring to the valve shaft.

4. The flush control valve core assembly of claim 3, wherein the fastener is a nut.

5. The flush control valve core assembly of claim 4, wherein an end portion of the valve shaft is threaded to receive the nut.

6. The flush control valve core assembly of claim 5, wherein the holder has a fastening circle engaging the valve shaft.

7. The flush control valve core assembly of claim 6, wherein a gasket is positioned under the nut to engage the holder.

8. A flush control valve core assembly comprising:
   a valve core body;
   a back spring;
   a valve piece; and
   a fastener;
   wherein the valve core body comprises a recess configured to receive the valve piece;
   wherein the valve piece comprises a discharge hole;
   wherein a portion of the back spring extends as a pin structure extends through the discharge hole of the valve piece; and
   wherein the fastener fastens the valve piece and back spring to the valve core body.

9. The flush control valve core assembly of claim 8, wherein the pin structure of the back spring is formed by a first portion bending horizontally toward the center of the valve core body and a second portion bending downwards vertically.

10. The flush control valve core assembly of claim 9, wherein the back spring further comprises a holder formed by a bent third portion of the back spring.

11. The flush control valve core assembly of claim 10, wherein the valve shaft is threaded, and threadably receives the fastener.

12. The flush control valve core assembly of claim 11, wherein a gasket is positioned under the fastener to engage the holder of the back spring.

13. A flush control valve core assembly comprising:
   a valve core body;
   a valve shaft; and
   a back spring accommodated in the valve core body;
   wherein the back spring further comprises a cylindrical frame, a pin structure, and a holder;
   wherein the pin structure is located between the cylindrical frame and the holder of the back spring; and
   wherein the holder of the back spring is configured to be received by the valve shaft.

14. The flush control valve core assembly of claim 13, further comprising a valve piece having a discharge hole.

15. The flush control valve core assembly of claim 14, wherein the pin structure of the back spring is adapted to slidably move in the discharge hole of the valve piece.

16. The flush control valve core assembly of claim 13, wherein:
   the pin structure is formed by a first portion and a second portion of the back spring;
   the first portion of the pin structure is horizontally bent towards the holder; and
   the second portion of the back spring is vertically bent downward.

17. The flush control valve core assembly of claim 13, further comprising a fastener;
   wherein the holder of the back spring is coupled to the valve shaft by the fastener.

18. The flush control valve core assembly of claim 17, wherein a portion of the valve shaft is threaded and the fastener is received by the valve shaft.

19. The flush control valve core assembly of claim 18, wherein a gasket is positioned under the fastener to engage the holder of the back spring.

20. A flush control valve core assembly comprising:
    a valve core body;
    a valve shaft;
    a back spring accommodated in the valve core body; and
    a valve piece having a discharge hole;
    wherein the back spring further comprises a cylindrical frame, a pin structure, and a holder; and
    wherein the pin structure is located between the cylindrical frame and the holder of the back spring.

\* \* \* \* \*